(No Model.) 4 Sheets—Sheet 1.
E. P. BARBER.
COMPRESSED AIR BRAKING APPARATUS.
No. 494,772. Patented Apr. 4, 1893.
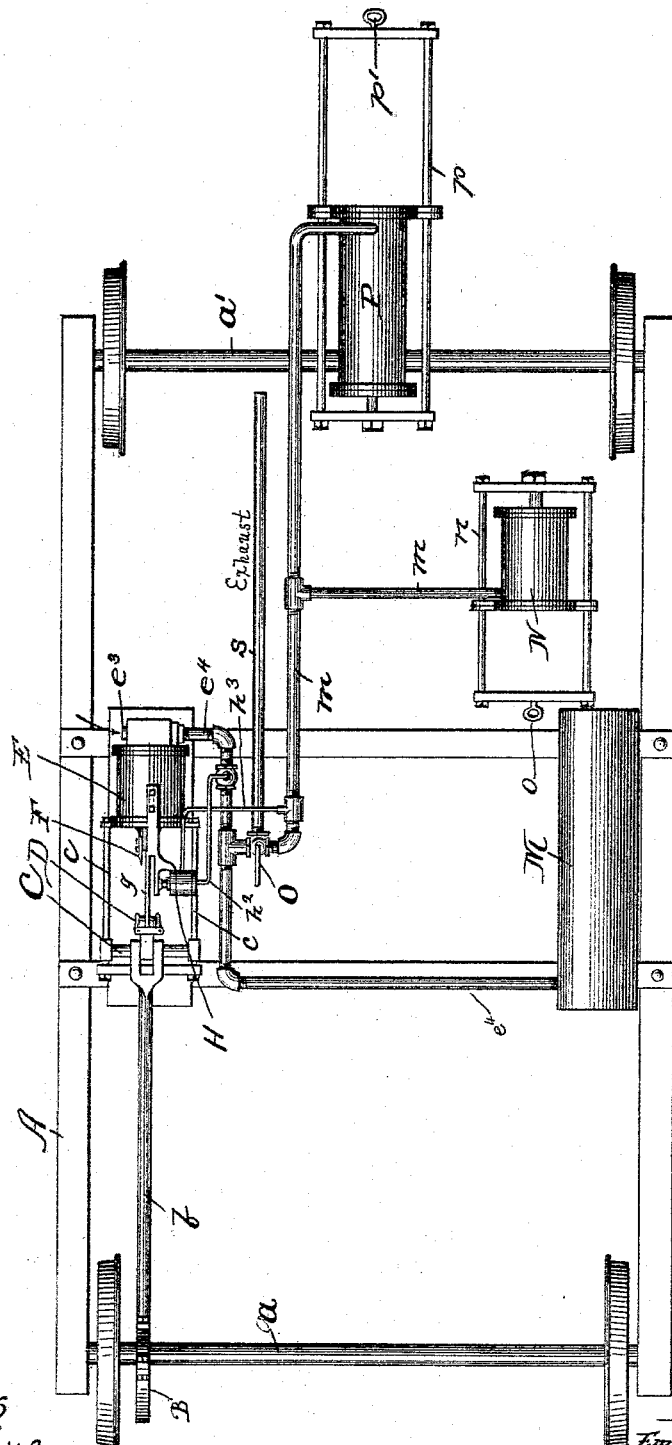
Witnesses
Wm. F. Henning
Wm. N. Rheem
Inventor:
Emmett P. Barber
by Munday, Evarts & Adcock
his Attorneys.

(No Model.) 4 Sheets—Sheet 2.
E. P. BARBER.
COMPRESSED AIR BRAKING APPARATUS.
No. 494,772. Patented Apr. 4, 1893.
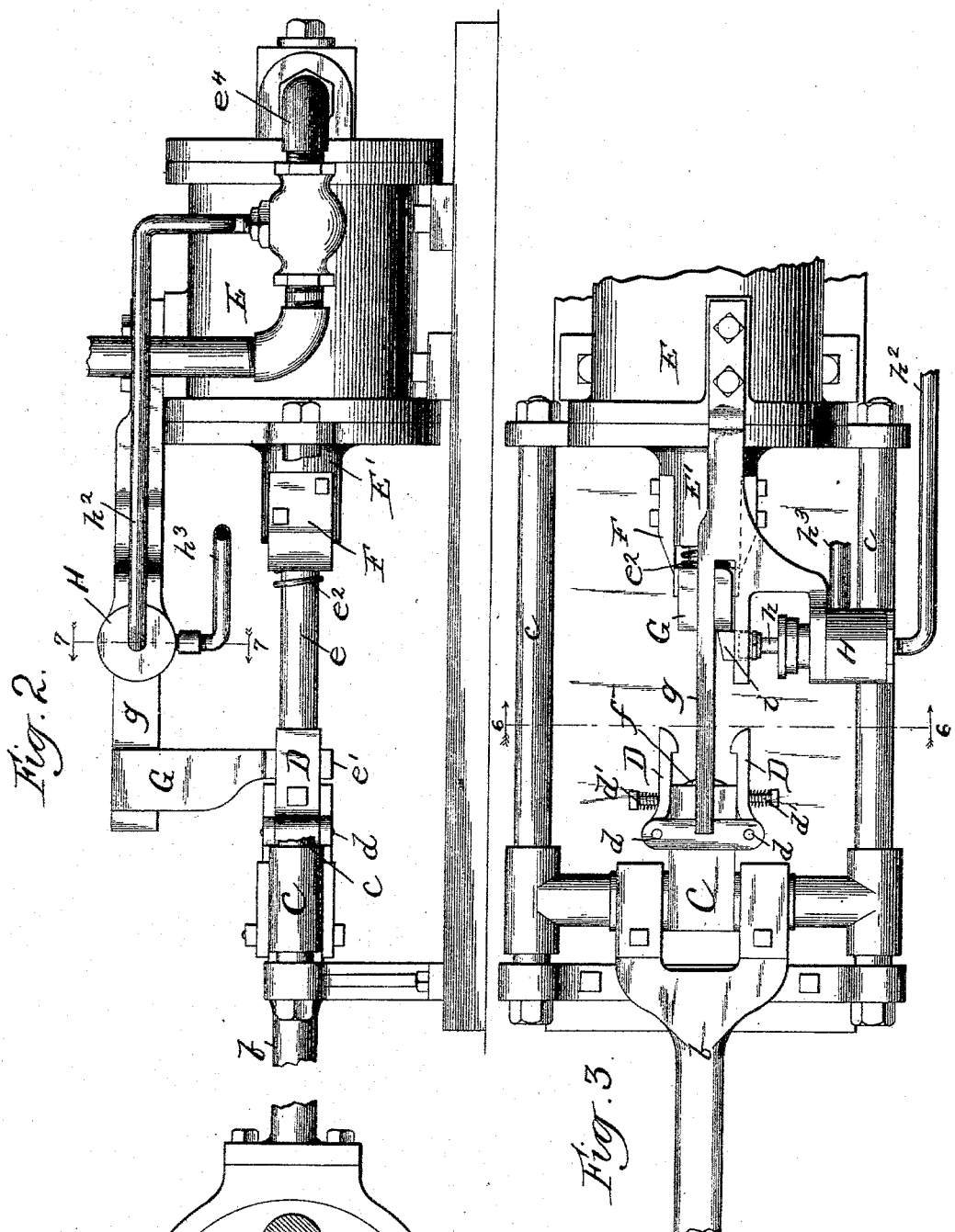
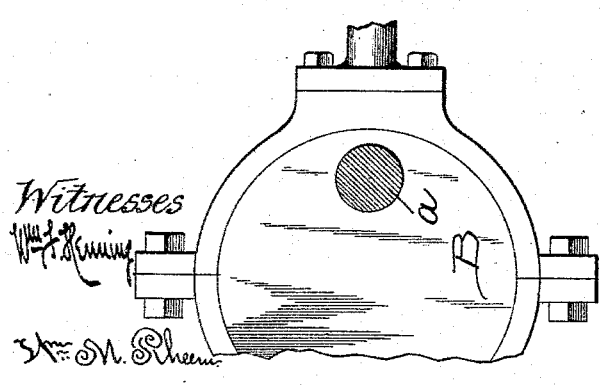
Witnesses
Inventor:
Emmett P. Barber
by Munday, Evarts & Adcock
his Attorneys.

(No Model.) 4 Sheets—Sheet 3.
E. P. BARBER.
COMPRESSED AIR BRAKING APPARATUS.
No. 494,772. Patented Apr. 4, 1893.

Witnesses
Wm. F. Henning
Wm. M. Rheem

Inventor:
Emmett P. Barber
by Munday, Evarts & Adcock
his Attorneys (No Model.) 4 Sheets—Sheet 4.

E. P. BARBER.
COMPRESSED AIR BRAKING APPARATUS.

No. 494,772. Patented Apr. 4, 1893.

Witnesses

Inventor:
Emmett P. Barber
by Munday, Evarts & Adcock
his Attorneys

UNITED STATES PATENT OFFICE.

EMMETT P. BARBER, OF CHICAGO, ILLINOIS.

COMPRESSED-AIR BRAKING APPARATUS.

SPECIFICATION forming part of Letters Patent No. 494,772, dated April 4, 1893.

Application filed July 11, 1892. Serial No. 439,585. (No model.)

*To all whom it may concern:*

Be it known that I, EMMETT P. BARBER, a citizen of the United States, residing at Chicago, in the county of Cook and State of Illinois, have invented a new and useful Improvement in Compressed-Air Braking Apparatus, of which the following is a specification.

This invention relates to air pressure braking apparatus for street cars.

Although several inventors have applied air pressure brakes to street cars, yet so far as my knowledge extends no previous construction of such brakes has yet been brought to a sufficient degree of perfection to warrant its adoption by the street car companies. I have endeavored in this invention to obviate the difficulties heretofore encountered, and to devise a form of apparatus which is both efficient and certain in its operation, and is also simple and economical in manufacture.

The nature of the improvements is fully set forth below, and illustrated in the accompanying drawings, in which latter—

Figure 4:
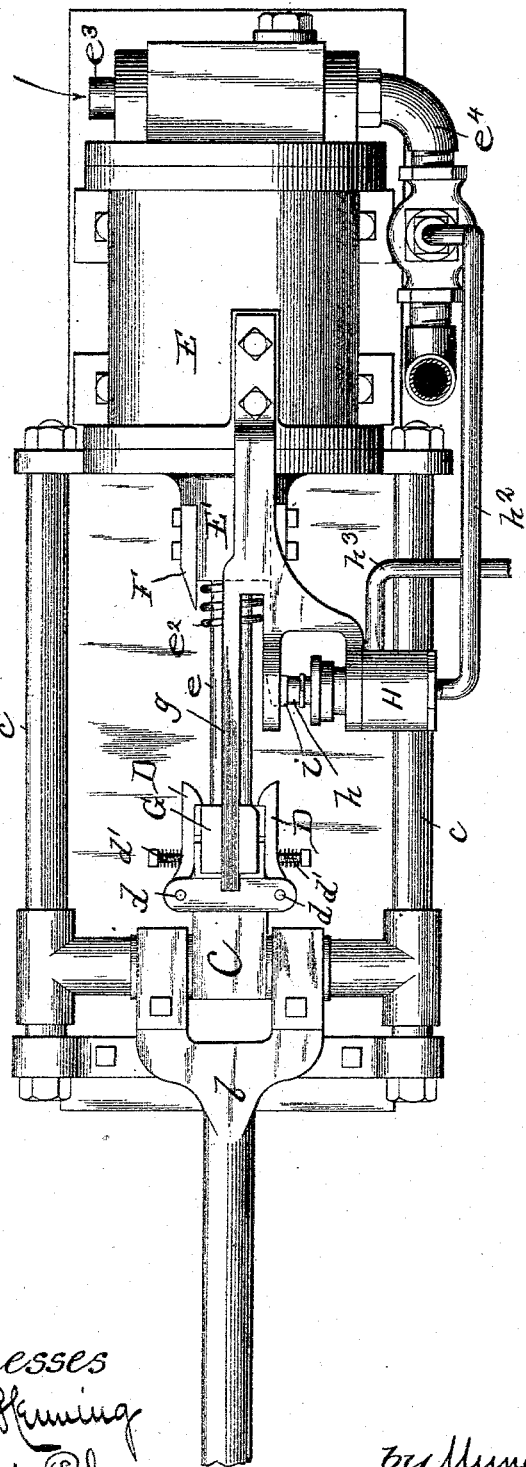
Figure 5:
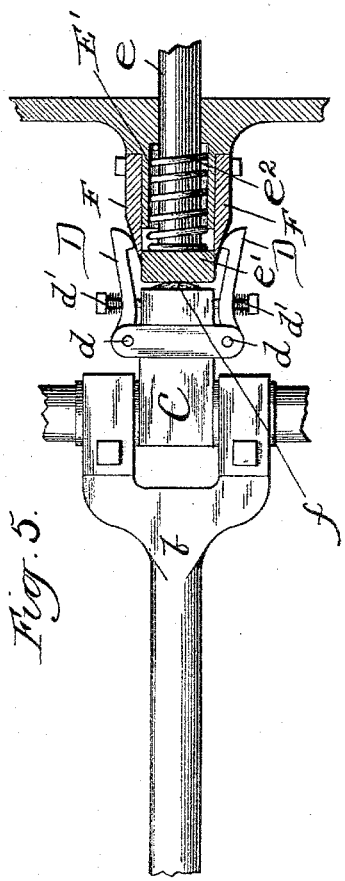
Figure 6:
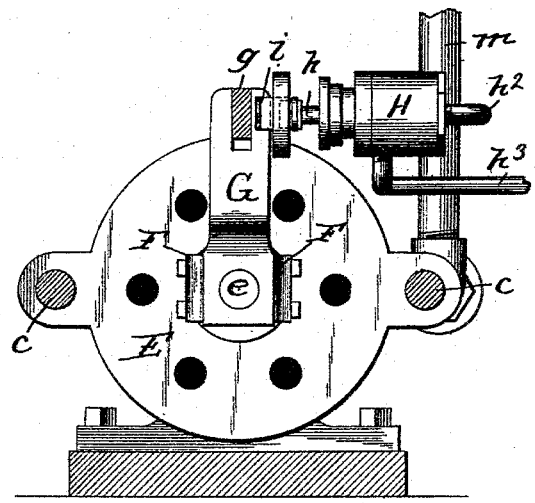
Figure 7:
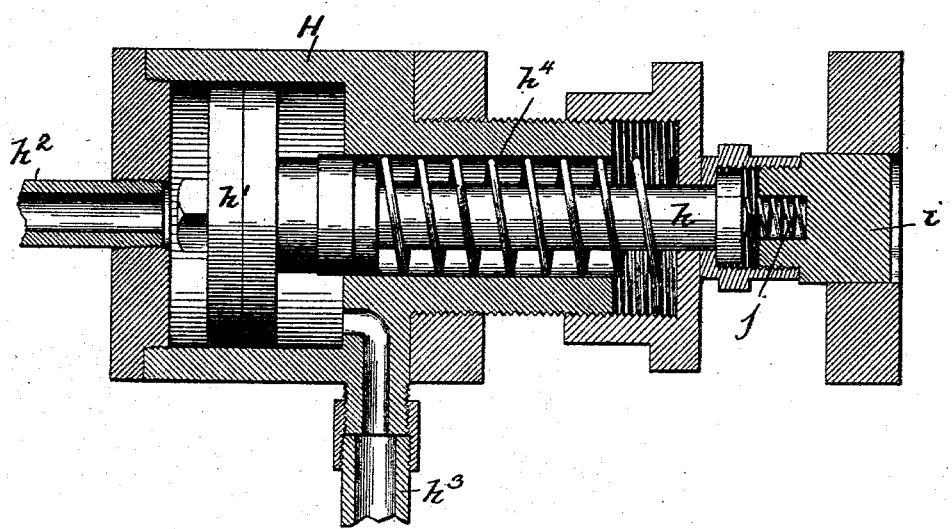

Figure 1 is a general plan view of a car truck having my braking apparatus in position thereon. Fig. 2 is a longitudinal vertical section showing the pumping cylinder in elevation. Figs. 3 and 4 are partial horizontal sections, the former showing the pump piston released from its actuating grippers, and the latter showing the grippers in action. Fig. 5 is a partial horizontal section further illustrating the action of the grippers. Fig. 6 is a section on the line 6—6 of Fig. 3, and Fig. 7 is a section on the line 7—7 of Fig. 2.

In the drawings A represents the truck frame and $a$ $a'$ the axles of the carrying wheels. Upon the frame A I mount or secure the compressed air apparatus for actuating the brake levers, and consisting of the pump E, air reservoir M, brake cylinder N and their pipe connections hereinafter set forth. The valve by which the driver controls the apparatus is located at O.

I will first describe the manner of charging the apparatus with air. Rigid upon the axle $a$ is an eccentric B actuating the rod $b$ and giving motion to a cross head C traveling upon rods $c$. The cross head carries a pair of grippers D, each pivoted at $d$, and each acted upon by a spring $d'$. The grippers are preferably fashioned as illustrated to adapt them to seize the pump piston as described below and to draw the latter outward, and also to adapt them to be thrown off or disengaged from the piston by the deflecting guides hereinafter mentioned.

E is the cylinder of the pump which supplies air to operate the brakes, and $e$ is the piston rod thereof. Upon the end of this rod is an enlargement or head $e'$ adapted to be seized by the grippers D. A spring $e^2$ encircles the rod $e$ and is confined thereon between said head $e'$ and the pump cylinder, and exerts its force on the rod in an outward direction. There are also secured to the outside of the hub E' formed upon the cylinder head and surrounding the rod, two beveled faced guides F adapted to throw off the grippers at the conclusion of each inward stroke imparted to the piston. The outward stroke of the piston is due to the grippers, while the inward stroke thereof is caused by the cross head acting upon the head of the piston rod. In order to cushion and render noiseless this contact of the cross head with the rod a rubber bumper $f$ is inserted in the cross head. The cylinder takes in air at $e^3$, and discharges it by the pipe $e^4$, both being located at the same end of the cylinder and guarded by proper valves. The interior construction of this pump and its inlet and outlet will be readily understood without further description or illustration.

Attached to the outer end of the piston rod $e$ is a laterally extending arm G slotted at its upper end so it may give room to the stationary guide $g$, and be regulated and steadied in its movements by said guide. Whenever the reservoir of the brake apparatus becomes sufficiently charged by the pump and it is desirable consequently to throw the latter out of action for a time, a stop $i$ is thrown across the path of the arm G as illustrated at Figs. 3 and 6. This stop confines the piston rod in its innermost position against the combined pressure of the spring $e^2$ and the air within the pump, and in this position the grippers are caused to move idly over the deflectors F and are prevented from seizing the head $e'$. The lock upon the piston continues until the pressure in the apparatus is reduced below the normal, when the stop $i$ is withdrawn as hereinafter described, and the power of the spring aided by the internal pressure in the pump then immediately forces the piston outward far enough to enable the grippers to engage with the head $e'$, and resume the pumping. The stop is mounted upon the end of the stem $h$ of a piston $h'$ traversing the air cylinder H. This cylinder is connected at one end by the pipe $h^2$ to the pipe $e^4$ which leads from the pump to the reservoir, and at the other end it is connected by the pipe $h^3$ with the pipe $m$ extending from the brake cylinder to a junction with the pipe $e^4$, the connection of said pipe $h^3$ with said pipe $m$ being located between the valve O and the brake cylinder. It will be noticed from what has already been described that the normal air pressure in the reservoir will also exist in this cylinder H and upon that side of the piston where it may tend to force the stop into engagement with the pump rod, and that air pressure upon the opposite side of said piston will only be felt when the brake is energized by the admission of air to the pipe $m$. This air pressure when it is present balances that upon the other side of the piston $h'$, and allows the latter to move in obedience to the spring $h^4$ encircling its stem $h$, and to withdraw the stop $i$ from its acting position. So long as the air pressure remains equal on the opposite sides of piston $h'$, the latter will remain in the retracted position, so that the pumping may proceed without interference on the part of the stop $i$. Upon the throwing off of the brake however, the pressure in the pipe $m$ will be relieved and if the normal pressure in the reservoir is restored, the piston $h'$ will then be free to move under such normal pressure and force the stop into its locking position. In this manner the stop is automatically thrown into and out of action by the employment of the air pumped into the apparatus.

The stop $i$ has a spring $j$ interposed between it and the piston stem $h$, so that should the arm G come in contact with it when it is retracted or partially so, it may yield and get out of the way of the arm.

The brake cylinder actuates the frame $n$ to which the brake levers of the car may be attached at the eye $o$. I do not illustrate the levers as they form no part of my present invention.

My air brake apparatus is readily adaptable to use upon cable and other street cars which are run in trains, and I illustrate at Fig. 1 a construction by which the brakes of the "trailers," as they are commonly called may be actuated and controlled from the propelling car. The pipe $m$ is extended beyond its junction with the brake cylinder N into connection with a second brake cylinder P which may be of larger capacity than cylinder N. This cylinder P actuates a sliding frame $p$ which may be connected to the brake system of the trailer or trailers by means of the eye $p'$. By means of this second cylinder the brakes of the trailers may be set simultaneously with those of the grip or propelling car.

The valve O is a three way valve so that it is adapted, when the brakes are to be applied, to open up communication between the pipe $e^4$ and the pipe $m$, and at the same time to shut off the pipe $s$ through which the air is allowed to escape from the brake cylinder after it has been used to set the brakes. It must also serve to simultaneously break the communication between the pipes $e^4$ and $m$ and open pipe $s$. The pipe $s$ is joined to the casing of the valve and when it is opened the valve also opens pipe $m$, so that the air in the latter and in the brake cylinders may be discharged.

The operation of my invention is substantially as follows: The movement of the car of course causes a reciprocation of the cross head carrying the grippers. The latter however pass idly over the head upon the pump piston rod when the reservoir is charged to its normal capacity, and so long as this condition continues the stop $i$ is in locking position with the arm carried by the piston rod, owing to the normal air pressure upon one side of the piston $h'$. If now the driver desires to apply the brakes he turns the valve O in such manner as to shut off the escape $s$ and open the way from the pipe $e^4$ into the pipe $m$. He thereby energizes the brake cylinder N and also the cylinder P, if that be used, and sets the brakes into operation. The admission of the air to the brake cylinders also admits air to the opposite side of piston $h'$, thereby establishing an equilibrium of pressure upon both sides of that piston and allowing the retraction of stop $i$ under the power of the spring $h^4$. If the car is in motion at this time the pumping will be immediately resumed and in any event will be resumed as soon as the motion commences, the retraction of the stop $i$ allowing the pump piston to move outwardly a sufficient distance to insure action thereon by the grippers. The normal pressure in the reservoir is soon restored by the pumping and the loss of air caused by the setting of the brakes is again made good.

I claim—

1. In compressed air braking apparatus, the combination with the air pump piston of a reciprocating device for actuating said piston and adapted to push it in one direction, and releasable grippers borne upon one of said parts and adapted to unite them during the stroke in the other direction, substantially as specified.

2. In compressed air braking apparatus, the combination with the air pump piston of a reciprocating device for actuating said piston and adapted to push it in one direction, releasable grippers borne upon one of said parts and adapted to unite them during the stroke in the other direction, means for throwing the grippers into action and means for releasing them, substantially as specified.

3. In compressed air braking apparatus, the combination with the air pump piston and its actuating device of releasable grippers adapted to unite the two when the pump is to be operated and means for releasing said grippers at the end of each inward stroke, said grippers being provided with springs for throwing them into action, substantially as specified.

4. In compressed air braking apparatus, the combination with the air pump piston of a reciprocating device for actuating said piston and adapted to push it in one direction, releasable grippers borne upon one of said parts and adapted to unite them during the stroke in the other direction, and means for locking the piston against movement when air is not needed, substantially as set forth.

5. In compressed air braking apparatus, the combination with the air pump piston of a reciprocating device for actuating said piston, and adapted to push it in one direction, releasable grippers borne upon one of said parts and adapted to unite them during the stroke in the other direction, a stop for locking the piston against movement when air is not needed, and means for moving said stop into and out of the locking position, substantially as specified.

6. In compressed air braking apparatus, the combination with the air pump piston of a reciprocating device for actuating said piston and adapted to push it in one direction, releasable grippers borne upon one of said parts and adapted to unite them during the stroke in the other direction, a stop for locking the piston against movement when air is not needed, and an air cylinder and piston for moving said stop into and out of locking position, substantially as specified.

7. In compressed air braking apparatus, the combination with the air pump piston of a reciprocating device for actuating said piston and adapted to push it in one direction, releasable grippers borne upon one of said parts and adapted to unite them during the stroke in the other direction, a stop for locking the piston against movement when the air is not needed, and an air cylinder and piston for moving said stop into and out of locking position, said last mentioned piston having an overbalancing spring, substantially as specified.

8. The combination in a braking apparatus and with the air pump and its operating device, having releasable grippers adapted to seize the piston of the pump of an automatic stop for locking the piston of the pump, and an air cylinder connected to the air system of the brake for moving said stop into its operating position, substantially as specified.

9. The air pump piston having the laterally extending arm, in combination with the stop $i$, means for operating said stop, and a reciprocating device having releasable grippers for drawing out the piston, substantially as specified.

10. The combination with the piston of the air pump, having an enlargement or shoulder at the end of its rod, of the reciprocating cross head adapted to move said rod in one direction, and having grippers adapted to engage said enlargement or shoulder and thereby to move said rod in the other direction, substantially as specified.

11. The combination with the pump rod of the reciprocating cross head having spring pressed grippers for engaging or gripping said rod, and the beveled guides F for releasing said grippers, substantially as specified.

12. The combination with the pump rod of the reciprocating cross head having spring pressed grippers for engaging said rod, the beveled guides F upon the pump cylinder and acting to release said grippers, the arm G carried by the rod, the stop $i$ adapted to lock the rod by its contact with arm G, and means for automatically moving said stop into and out of the path of said arm, substantially as specified.

EMMETT P. BARBER.

Witnesses:
H. M. MUNDAY,
LEW. E. CURTIS.